(12) United States Patent
Hurley et al.

(10) Patent No.: US 12,276,853 B2
(45) Date of Patent: Apr. 15, 2025

(54) HIGH TENSILE STRENGTH FIBER OPTIC CABLE WITH LOW LEVELS OF ARAMID FIBER

(71) Applicant: Corning Research & Development Corporation, Corning, NY (US)

(72) Inventors: William Carl Hurley, Hickory, NC (US); Martina Petra Richter-Bühling, Neustadt bei Coburg (DE)

(73) Assignee: Corning Research & Development Corporation, Corning, NY (US)

( * ) Notice: Subject to any disclaimer, the term of this patent is extended or adjusted under 35 U.S.C. 154(b) by 257 days.

(21) Appl. No.: 18/106,622

(22) Filed: Feb. 7, 2023

(65) Prior Publication Data

US 2023/0185042 A1 Jun. 15, 2023

Related U.S. Application Data

(63) Continuation of application No. PCT/US2021/046230, filed on Aug. 17, 2021.

(60) Provisional application No. 63/068,603, filed on Aug. 21, 2020.

(51) Int. Cl.
*G02B 6/44* (2006.01)

(52) U.S. Cl.
CPC .......... *G02B 6/4434* (2013.01); *G02B 6/4436* (2013.01)

(58) Field of Classification Search
CPC ........................ G02B 6/4434; G02B 6/4436
See application file for complete search history.

(56) References Cited

U.S. PATENT DOCUMENTS

| 2004/0149483 | A1* | 8/2004 | Glew | G02B 6/4431 |
| | | | | 174/113 C |
| 2013/0077922 | A1 | 3/2013 | Weimann et al. | |
| 2014/0219618 | A1 | 8/2014 | Barrett et al. | |
| 2015/0185428 | A1* | 7/2015 | Tani | G02B 1/045 |
| | | | | 428/373 |
| 2018/0231729 | A1* | 8/2018 | Baetz | G02B 6/44386 |
| 2018/0292624 | A1 | 10/2018 | Scarpaci et al. | |
| 2019/0113703 | A1 | 4/2019 | Cook et al. | |
| 2019/0391352 | A1 | 12/2019 | Scarpaci et al. | |

OTHER PUBLICATIONS

International Search Report and Written Opinion of the International Searching Authority; PCT/US2021/046230; dated Nov. 9, 2021; 18 pages; United States Patent Office.

(Continued)

*Primary Examiner* — Sung H Pak
*Assistant Examiner* — Hoang Q Tran
(74) *Attorney, Agent, or Firm* — Thomas R. Irwin

(57) ABSTRACT

An optical fiber cable is provided. The optical fiber cable includes an outer jacket having an outer surface defining an outermost surface of the optical fiber cable and an inner surface defining a central bore. The optical fiber cable includes a plurality of aramid fibers located in the central bore, and the plurality of aramid fibers have a relatively low total linear density such that a total linear density of all aramid fibers within the central bore is less than 10,000 dtex. The optical fiber cable includes at least one optical fiber located within the central bore, and the at least one optical fiber has a proof test of greater than 100 kpsi.

19 Claims, 4 Drawing Sheets

(56) References Cited

OTHER PUBLICATIONS

"Fibre Optic Cables Product Catalogue 2014/2015", Retrieved from: www.kabelovna.cz/files/KDP—Fiber Optic Catalogue 2014.pdf, 2014, pp. 1-383.

Anonymous et al: "CPR, New EU Regulation for construction materials", Retrieved from: www.cablesrct.com/ descargas/va rios/ CPRdocumento-en.pdf, 2016, pp. 1-20.

Extended European Search Report, EP application No. 21858933.1, dated Sep. 20, 2024, 11 pages, EP patent office.

* cited by examiner

4f BLOWN CABLE

| | TENSILE | OD /mm | ARAMID | TOTAL pH VALUE WEIGHT | TOTAL CONDUCTIVITY WEIGHTED ($\mu$S/mm) | ACIDITY RATING | ARAMID WB | WEIGHT (kg/km) | LAB | pH VALUE | CONDUCTIVITY ($\mu$S/mm) | WEIGHTED pH VALUE | WEIGHTED CONDUCTIVITY |
|---|---|---|---|---|---|---|---|---|---|---|---|---|---|
| CURRENT DESIGN | 200 N | 2.4 | 3X1680 WB | 6.5 | 1.99 | a1 | ARAMID WB | 0.54 | VDE | 7.3 | 17.1 | 3E-08 | 9.2 |
| NEW | 424 N | 2.6 | 6X1680 WB | 6.6 | 3.17 | a2 | ARAMID WB | 1.08 | VDE | 7.3 | 17.1 | 5E-08 | 18.5 |
| NEW | 623 N | 2.6 | 9X1680 WB | 6.6 | 4.62 | a2 | ARAMID WB | 1.62 | VDE | 7.3 | 17.1 | 8E-08 | 27.7 |

FIG. 2

12f BLOWN CABLE

| | TENSILE | OD /mm | ARAMID | TOTAL pH VALUE WEIGHT | TOTAL CONDUCTIVITY WEIGHTED ($\mu$S/mm) | ACIDITY RATING | ARAMID WB | WEIGHT (kg/km) | LAB | pH VALUE | CONDUCTIVITY ($\mu$S/mm) | WEIGHTED pH VALUE | WEIGHTED CONDUCTIVITY |
|---|---|---|---|---|---|---|---|---|---|---|---|---|---|
| CURRENT DESIGN | 200 N | 2.65 | 3X1680 WB | 6.5 | 1.83 | a1 | ARAMID WB | 0.54 | VDE | 7.3 | 17.1 | 3E-08 | 9.2 |
| NEW | 424 N | 2.6 | 5X1680 WB | 6.4 | 3.00 | a2 | ARAMID WB | 0.90 | VDE | 7.3 | 17.1 | 5E-08 | 15.4 |
| NEW | 623 N | 2.6 | 8X1680 WB | 6.5 | 4.36 | a2 | ARAMID WB | 1.44 | VDE | 7.3 | 17.1 | 7E-08 | 24.6 |

FIG. 3

HIGH TENSILE STRENGTH FIBER OPTIC CABLE WITH LOW LEVELS OF ARAMID FIBER

PRIORITY APPLICATION

This application is a continuation of International Patent Application No. PCT/US2021/046230 filed Aug. 17, 2021, which claims the benefit of priority to U.S. Provisional Application Ser. No. 63/068,603 filed on Aug. 21, 2020, the content of each of which is relied upon and incorporated herein by reference in its entirety.

BACKGROUND

The disclosure relates generally to communication cables and more particularly to an optical fiber cable that has high tensile strength performance and low levels of aramid fibers. Optical cables have seen increased use in a wide variety of fields including various electronics and telecommunications fields. Optical cables contain or surround one or more optical fibers. The cable provides structure and protection for the optical fibers within the cable.

SUMMARY

One embodiment of the disclosure relates to an optical fiber cable. The optical fiber cable includes an outer jacket having an outer surface defining an outermost surface of the optical fiber cable and an inner surface defining a central bore. The optical fiber cable includes a plurality of aramid fibers located in the central bore, and the plurality of aramid fibers have a relatively low total linear density such that a total linear density of all aramid fibers within the central bore is less than 10,000 decitex (dtex). The optical fiber cable includes at least one optical fiber located within the central bore, and the at least one optical fiber has a proof test of greater than 100 kilopounds per square inch (kpsi).

Another embodiment of the disclosure relates to an optical fiber cable. The optical fiber cable includes an outer jacket having an outer surface defining an outermost surface of the optical fiber cable, an inner surface defining a central bore and a maximum outer dimension of less than 3 millimeters (mm). The optical fiber cable includes one or more aramid fibers located in the central bore, and the one or more aramid fibers have a relatively low total linear density such that a total linear density of all aramid fibers within the central bore is less than 10,000 dtex. The optical fiber cable includes one to twelve optical fibers located within the central bore. There are no metal strength members or glass yarn strength members located within the central bore. Each of the one to twelve optical fibers experiences less than or equal to 1.5% short term fiber strain when exposed to a short term tensile load of 400 Newtons (N), and the optical cable has a conductivity of less than <2.5 µS/mm during burn as measured by EN 50267-2-3.

Another embodiment of the disclosure relates to an optical fiber cable. The optical fiber cable includes an outer jacket having an outer surface defining an outermost surface of the optical fiber cable, an inner surface defining a central bore and a maximum outer dimension of less than 3 mm. The optical fiber cable includes an inner jacket having an outer surface facing the inner surface of the outer jacket and an inner surface defining an inner jacket bore. The optical fiber cable includes a plurality of aramid fibers located between the outer surface of the inner jacket and the inner surface of the outer jacket. The plurality of aramid fibers have a relatively low total linear density such that a total linear density of all aramid fibers within the central bore is between 3,000 and 7,000 dtex. The optical fiber cable includes one to twelve optical fibers located within the inner jacket bore, and each of the one to twelve optical fibers has a proof test equal to or greater than 200 kpsi. Each of the one to twelve optical fibers experiences less than or equal to 1.5% short term fiber strain when exposed to a short term tensile load of 400 N, and the optical cable has a conductivity of less than <2.5 µS/mm during burn as measured by EN 50267-2-3.

Additional features and advantages will be set forth in the detailed description that follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding and are incorporated in and constitute a part of this specification. The drawings illustrate one or more embodiment(s), and together with the description serve to explain principles and the operation of the various embodiments.

BRIEF DESCRIPTION OF THE DRAWINGS

FIG. 2 is a table showing properties of three potential four fiber cable designs using 100 kpsi optical fiber and varying levels of aramid fibers to achieve an identified tensile performance.

FIG. 3 is a table showing properties of three potential twelve fiber cable designs using 100 kpsi optical fiber and varying levels of aramid fibers to achieve an identified tensile performance.

DETAILED DESCRIPTION

Figure 1:
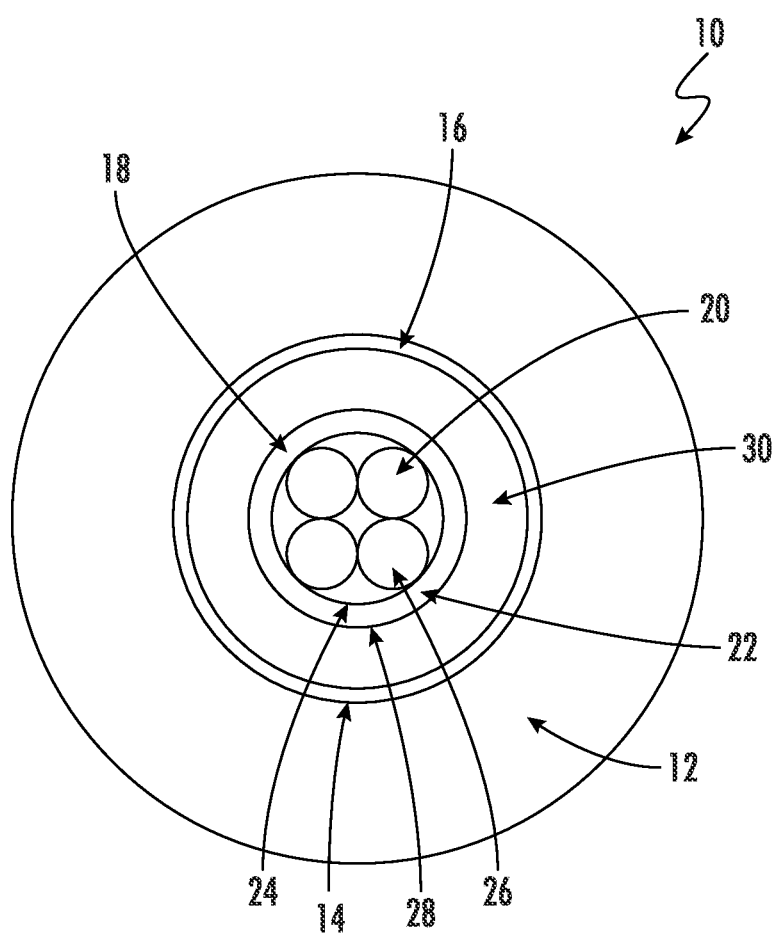
FIG. 1 is a cross-sectional view of an optical fiber cable, according to an exemplary embodiment.

Referring generally to the figures and description below, various embodiments of optical fiber cables having high tensile strength performance and relatively low levels of aramid fiber are provided. Fiber optic cable designs typically have to strike a balance between a number of competing and often opposing design considerations. The optical fiber cable discussed herein utilizes an innovative design to provide a sufficiently low level of conductivity in the acid gas burn test, a small cable size for duct installation and a high tensile strength with acceptable fiber strain, both for short and long term tensile load performance.

Conventional cable designs typically look toward use of various strength elements, for example, steel/metal strength members and/or large amounts of aramid fiber, to provide high tensile strength. However, Applicant has determined that increased levels of aramid fiber to provide tensile and fiber strain performance also tends to yield a fiber optic cable that has relatively high levels of conductivity in the acid gas burn test, and use of other non-aramid strength members (e.g., metal wire, glass yarns, high molecular weight polymer material, etc.) cause other design deficiencies, such as need from grounding, increased expenses, lower flexibility, higher weight, etc.

Thus, Applicant has designed a cable that utilizes low levels of aramid strength fibers within a relatively small jacket and that includes high proof test optical fibers (e.g., 200 kpsi proof test optical fibers) that provides for the unique combination of low level of conductivity in the acid gas burn test, small cable size and a high tensile strength with acceptable fiber strain, both for short and long term performance.

Essentially all optical fiber used today in commercial fiber optic cable is 100 kpsi proof tested fiber. Due to lower yields from the optical fiber manufacturing process, utilizing 200 kpsi proof tested fiber is conventionally understood to be inefficient/too expensive and unnecessary, as 100 kpsi proof tested fiber has typically sufficient strain performance in typical cable designs. Despite this conventional cable design understanding, Applicant has developed a cable design that utilizes the higher strain performance of 200 kpsi proof tested optical fibers in combination with a small cable diameter and relatively low levels of aramid to provide a cable with the performance and size discussed herein, a combination of which Applicant believes to be unachievable using conventional 100 kpsi proof tested fibers.

As background regarding proof testing of optical fibers, the tensile strength of most materials is determined by the load at which the material breaks. In contrast, the tensile strength of an optical cable is determined by the reliability of the optical fibers, which depends on the time-stress history of the optical fibers. Optical fibers go through a proof test during manufacturing that determines the amount of stress that the fiber can experience during installation and operation with low probability of a fiber break during the lifetime of the cable. Cable standards such as ICEA-596 or GR-409 specify a limit on the allowed fiber strain during installation and operation of the cable based on the maximum fiber strain during the proof test. Following these guidelines will ensure less than one fiber break per million meters of fiber over a 20 year life of the cable. The typical proof test, to which more than 99.999% of all optical fibers are tested, is 100 kpsi. As compared to 100 kpsi fiber, 200 kpsi fiber can withstand double the tensile load with the same failure rate as 100 kpsi fiber. However, because this failure rate is a function of flaws in the glass of the optical fiber formed during the manufacturing process, a smaller percentage of fiber will pass a 200 kpsi proof test, and thus conventional cable designs have not recognized a need/benefit of accepting the lower yields and increased expense associated with use of 200 kpsi fiber. Thus, the cable designs discussed herein buck conventional cable design thinking by utilizing 200 kpsi optical fiber to achieve high tensile performance and low conductivity in in the acid gas burn test.

Referring to FIG. 1, a cross-sectional view of an optical fiber cable, shown as cable 10, is shown according to an exemplary embodiment. Cable 10 includes an outer cable jacket or layer, shown as outer jacket 12. Cable jacket 12 has an inner surface 14 that defines a central bore 16. As will be generally understood, inner surface 14 of outer jacket 12 defines an internal area or region within which the various cable components are located.

Located within central bore 16 is a subunit 18. Subunit 18 includes one or more optical fibers, shown as optical fibers 20. In the specific embodiment shown, subunit 18 includes four optical fibers 20. In various embodiments, subunit 18 includes 1 to 12 optical fibers 20.

Subunit 18 includes a subunit jacket 22 that has an inner surface 24 that defines a subunit passage or inner jacket bore 26. Optical fibers 20 are located within inner jacket bore 26 and are surrounded circumferentially by subunit jacket 22.

Subunit jacket 22 includes an outer surface 28 that faces inner surface 14 of outer jacket 12. Cable 10 includes one or more aramid fibers, shown as a plurality of aramid fibers, forming aramid fiber layer 30. Aramid fiber layer 30 is located in the region between outer surface 28 of subunit jacket 22 and inner surface 14 of outer jacket 12.

In general, cable 10 is designed to provide a unique and innovative combination of cable performance characteristics. In particular, cable 10 has sufficiently low level of conductivity as measured by the acid gas burn test (e.g., measured by EN 50267-2-3), a small cable size for duct installation and a high tensile strength with acceptable fiber strain, both for short and long term performance. Conventional cable designs typically look toward use of steel/metal strength members and/or large amounts of aramid fiber to provide high tensile strength. As discussed herein, cable 10 utilizes a relatively low amount of aramid strength fiber (providing, at least in part, the low conductivity in the acid gas burn test) while still providing high tensile/strain fiber performance by using optical fibers 20 having higher proof test ratings than conventional cables.

In specific embodiments, cable 10 includes a relatively low level of aramid fiber (despite high tensile/strain performance discussed below) such that the total linear density of all aramid fibers 30 within central bore 16 is less than 10,000 dtex. In specific embodiments, the total linear density of all aramid fibers 30 within central bore 16 is between 3,000 and 7,000 dtex, more specifically is between 4000 dtex and 6000 dtex, and even more specifically between 4500 dtex and 5500 dtex. Applicant has identified that aramid fibers are a substantial contributor to conductivity/acidity during acid gas burn tests, and thus by lowering the amount of aramid fibers, improved acid gas burn test performance can be provided.

Applicant has further discovered that these low levels of aramid fibers can be used while still providing high tensile/strain performance by utilizing optical fibers 20 that have high proof test levels. In specific embodiments, optical fibers 20 have a proof test greater than 100 kpsi. In a specific embodiment, optical fibers 20 have a proof test equal to or greater than 200 kpsi. In an even more specific embodiment, optical fibers 20 have a proof test of 200 kpsi. In specific embodiments, proof testing of optical fibers as discussed herein are conducted as specified in cable standards such as ICEA-596 or GR-409, which specify a limit on the allowed fiber strain during installation and operation of the cable based on the maximum fiber strain during the proof test. Thus, in comparison to conventional fiber optic cables that utilize 100 kpsi optical fibers, Applicant has identified an improved functional advantage for using high proof test optical fibers combined with low levels of aramid fibers to provide a cable with low acidity burn test performance and high tensile/strain performance, despite the increased cost of using higher proof test fibers.

By using the high proof test optical fibers discussed herein, cable 10 has high tensile strength/strain performance despite low amounts of aramid and without relying on other non-aramid strength members, such as metal wires, glass yarns, glass reinforced plastic rods, high molecular weight polymer strength components, etc. In various embodiments of cable 10 discussed herein, optical fibers 20 experience less than or equal to 1.5% short term fiber strain when exposed to a short term tensile load of 400 N. In specific embodiments, optical fibers 20 experience less than or equal to 1.3% short term fiber strain, specifically 1.2% to 1.3% short term fiber strain and even more specifically 1.25% short term fiber strain, when exposed to a short term tensile load of 400 N.

Similarly, the cable designs discussed herein provide high levels of long term (permanent) tensile strength/strain performance. In various embodiments cable 10, discussed herein, optical fibers 20 experience less than or equal to 0.5% permanent fiber strain when exposed to a permanent tensile load of 100 N. In specific embodiments, optical fibers 20 experience less than or equal to 0.4% permanent fiber strain, specifically 0.3% to 0.4% permanent fiber strain and even more specifically 0.32% permanent fiber strain, when exposed to a permanent tensile load of 100 N. Permanent and short-term fiber strain as discussed herein can be measured as set forth in the relevant standards.

It should be noted that in these designs, the tensile/strain performance characteristics are provided with low levels of aramid and in which there are no non-aramid strength members (e.g., no metal or glass yarn strength members) located within central bore 16 of outer jacket 12. In these designs the low levels of aramid combined with the high proof test fibers provide both good burn performance and the strain performance noted above. As such, in various embodiments, cable 10 has an a1 acidity rating during burn as measured by EN 50267-2-3. Similarly, in various embodiments, cable 10 has a conductivity of less than <2.5 μS/mm during burn as measured by EN 50267-2-3.

In addition, cable 10 provides the performance characteristics discussed above (e.g., tensile strength/strain characteristics and conductivity/acid burn performance) while also providing a relatively small and compact cable size. In specific embodiments, the maximum outer dimension, shown as the outer diameter of the circular shaped cable 10, is less than 3 mm, and specifically is between 2.3 mm and 2.7 mm. In specific embodiments, cable 10 includes 1-4 optical fibers 20 and has an outer dimension between 2.2 mm and 2.6 mm and specifically is 2.4 mm. In other specific embodiments, cable 10 includes 6-8 optical fibers 20 and has an outer dimension between 2.4 mm and 2.6 mm and specifically is 2.55 mm. In another specific embodiment, cable 10 includes 12 optical fibers 20 and has an outer dimension between 2.5 mm and 2.7 mm and specifically is 2.65 mm.

In general, outer jacket 12 and/or subunit jacket 22 may be made from a variety of polymer materials typically used in cable constructions. However, in specific embodiments to further provide for burn performance, polymer materials of outer jacket 12 and/or subunit jacket 22 are a fire-resistant, non-corrosive polymer material.

In specific embodiments, outer jacket 12 and/or subunit jacket 22 are formed from a low smoke, zero halogen (LSZH) or flame retardant, non-corrosive (FRNC) composition. In certain embodiments, outer jacket 12 and/or subunit jacket 22 are formed from a polymer material including a flame retardant additive dispersed, mixed, or otherwise distributed in a polymeric material. In various embodiments, the polymeric material is a thermoplastic, and in a more specific embodiment, the thermoplastic is a polyolefin-based material. Polymer materials that may be used for outer jacket 12 and/or subunit jacket 22 include a single polymer or a blend of polymers selected from the following non-limiting list: ethylene-vinyl acetate copolymers, ethylene-acrylate copolymers, ethylene homopolymers (including but not limited to low density, medium density, and high density), linear low density polyethylene, very low density polyethylene, polyolefin elastomer copolymer, propylene homopolymer, polyethylene-polypropylene copolymer, butene- and octene branched copolymers, polyester copolymers, polyethylene terephthalates, polybutylene therephthalates, other polymeric terephthalates, and maleic anhydride-grafted versions of the polymers listed herein. As mentioned, outer jacket 12 and/or subunit jacket 22 may include at least one flame retardant additive. Exemplary flame retardant additives include aluminum trihydrate (ATH), magnesium hydroxide (MDH), ammonium polyphosphate (APP), pentaerythritol (PER), antimony oxides, zinc borates, boehmite, intumescent materials, and red phosphorous, among others.

In various embodiments, the polymer material of outer jacket 12 and/or subunit jacket 22 is a fire-resistant, non-corrosive polymer material having one or more of the following properties: a polyolefin base resin, metal oxide fire retardant(s), limiting oxygen index (LOI) greater than 40 and/or specific gravity greater than 1.50. In various embodiments, the polymer material of outer jacket 12 and/or subunit jacket 22 is a fire resistant material having one or more of the following properties: a PVC base resin, metal oxide fire retardant(s), LOI greater than 48 and/or a specific gravity greater than 1.55.

In various embodiments, optical fibers 20 discussed herein include optical fibers that are flexible, transparent optical fibers made of glass. The fibers function as a waveguide to transmit light between the two ends of the optical fiber. Optical fibers include a transparent glass core surrounded by a transparent cladding material with a lower index of refraction. Light is kept in the core by total internal reflection. Glass optical fibers may comprise silica, but some other materials such as fluorozirconate, fluoroaluminate and chalcogenide glasses, as well as crystalline materials such as sapphire, may be used. The light is guided down the core of the optical fibers by an optical cladding with a lower refractive index that traps light in the core through total internal reflection. The cladding may be coated by a buffer and/or another coating(s) that protects it from moisture and/or physical damage. These coatings may be UV-cured urethane acrylate composite materials applied to the outside of the optical fiber during the drawing process. The coatings may protect the strands of glass fiber. In various embodiments, the optical fibers may be bend insensitive optical fibers or multi-core optical fibers.

Cable Design Examples and Testing

Applicant has evaluated a number of potential designs for cable 10 as discussed above. Referring to Table 1 below specific designs for cable 10 are shown.

TABLE 1

| Fiber Count | Subunit Jacket OD | Aramid Yarns | Cable OD |
| --- | --- | --- | --- |
| 1 | 0.8 mm | 3 × 1680 WB | 2.4 mm |
| 2 | 0.8 mm | 3 × 1680 WB | 2.4 mm |
| 4 | 0.8 mm | 3 × 1680 WB | 2.4 mm |
| 6 | 1.1 mm | 3 × 1680 WB | 2.55 mm |
| 8 | 1.1 mm | 3 × 1680 WB | 2.55 mm |
| 12 | 1.3 mm | 3 × 1680 WB | 2.65 mm |

In specific embodiments, the cable designs shown in Table 1 utilize 200 kpsi fiber and LSZH materials for outer jacket 12.

Further, acidity calculations based on EN 50267-2-3 where conducted of the above designs. Applicant's calculations demonstrate that if the short term tensile strength performance at 400 N was provided via aramid alone, the amount of aramid would need to be increased from 5040 dtex (3×1680) to 10080 dtex (6×1680). However, Applicant's calculations demonstrate that this addition of aramid changes the conductivity from 1.99 µS/mm (a1 acidity rating with 5040 dtex of aramid) to 3.17 µS/mm (a2 acidity rating with 10,080 dtex of aramid) for 4 count fiber cable. Test data from cable designs at different tensile strength levels, with 100 kpsi fiber, achieving tensile performance through increased aramid is shown in the tables of FIGS. 2 and 3. As shown in these tables, utilizing aramid to increase tensile performance to 400 N or higher results in an a2 acidity rating measured under EN 50267-2-3.

Figure 4:
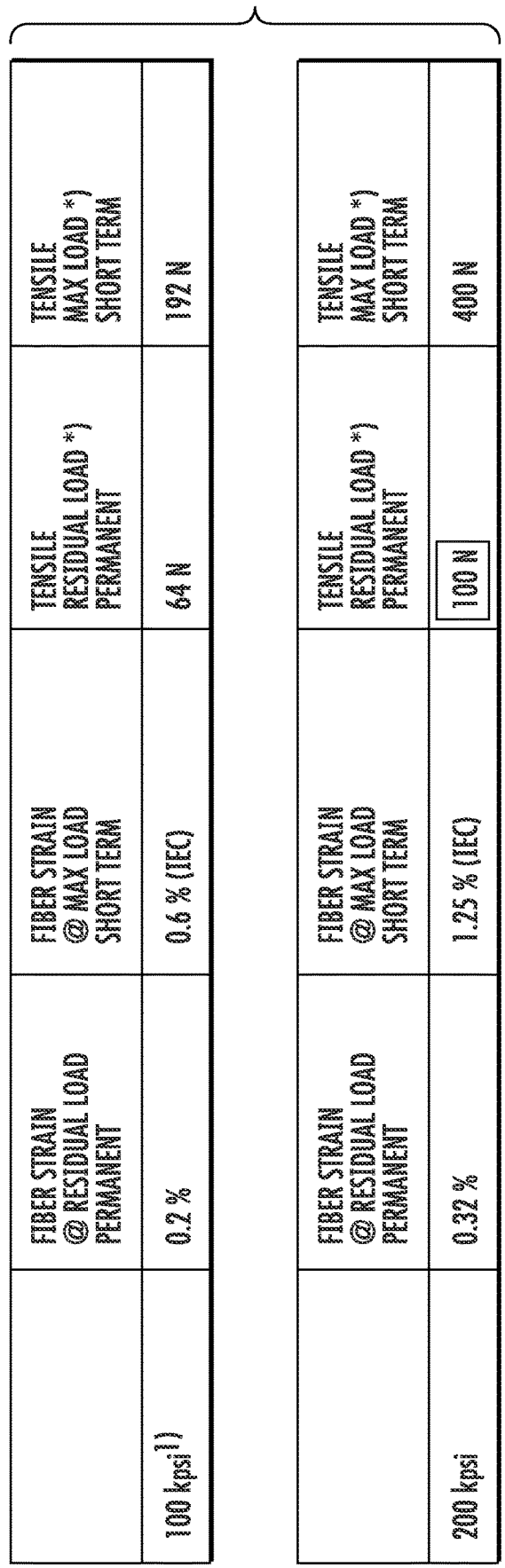
FIG. 4 shows the degree of fiber strain experienced by a 100 kpsi and 200 kpsi optical fibers at two different short term and two different permanent tensile load levels.
Figure 5:
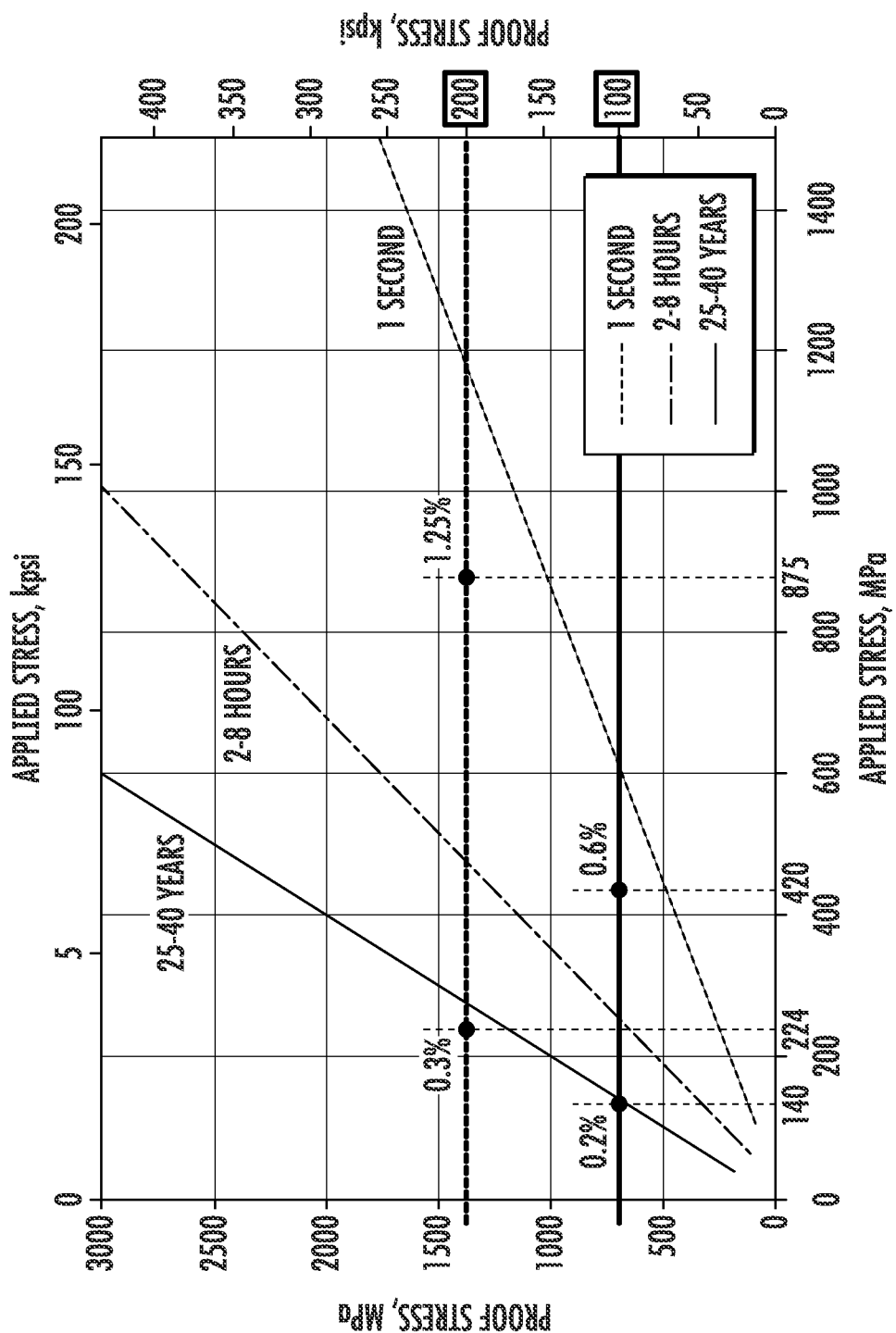
FIG. 5 is a chart showing the strain performance of optical fibers at different proof stress levels.

Referring to FIGS. 4-6, details of the tensile performance and fiber stress calculation is provided. In general, the 100 kpsi (0.7 GPa) proof test is equivalent to ~1% fiber strain or ~8 N. The calculation of tensile load by using 100 kpsi fiber is based on following design parameters: fiber strain for residual load=0.2% fiber strain (=140 MPa) and for maximum load=0.6% fiber strain (=420 MPa). The calculation of tensile load by using 200 kpsi fiber is based on following design parameters: fiber strain for residual load=0.32% fiber strain (=224 MPa) and for maximum load=1.25% fiber strain (=875 MPa).

Referring to FIG. 4, the above noted design parameters for 100 and 200 kpsi fibers was verified using the model described in Scott Glaeseman, "Optical Fiber Mechanical Reliability," FIG. 63, p. 57. Thus, FIG. 4 shows the permanent and short term fiber strain on both 100 kpsi and 200 kpsi fiber for select permanent and short term tensile loads. FIG. 5 is a chart showing performance of fibers having various levels of proof test under different levels of applied stress. FIG. 5 demonstrates that a 200 kpsi fiber can achieve the required 20 year reliability with a short term strain of 1.25% and a long term strain of 0.3%.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more than one component or element, and is not intended to be construed as meaning only one.

It will be apparent to those skilled in the art that various modifications and variations can be made without departing from the spirit or scope of the disclosed embodiments. Since modifications, combinations, sub-combinations and variations of the disclosed embodiments incorporating the spirit and substance of the embodiments may occur to persons skilled in the art, the disclosed embodiments should be construed to include everything within the scope of the appended claims and their equivalents.

What is claimed is:

1. An optical fiber cable comprising: an outer jacket having an outer surface defining an outermost surface of the optical fiber cable and an inner surface defining a central bore; a plurality of aramid fibers located in the central bore, wherein the plurality of aramid fibers have a relatively low total linear density such that a total linear density of all aramid fibers within the central bore is less than 10,000 dtex; and at least one optical fiber located within the central bore, wherein the at least one optical fiber has a proof test of greater than 100 kpsi; wherein there are no metal strength members or glass yarn strength members located within the central bore, wherein the at least one optical fiber experiences less than or equal to 1.5% short term fiber strain when exposed to a short term tensile load of 400 N, and further wherein the optical cable has a conductivity of less than <2.5 pS/mm during burn as measured by EN 50267-2-3.

2. The optical fiber cable of claim 1, wherein the at least one optical fiber has a proof test equal to or greater than 200 kpsi, wherein the total linear density of all aramid fibers within the central bore is between 3,000 and 7,000 dtex.

3. The optical fiber cable of claim 2, wherein the at least one optical fiber experiences less than or equal to 1.5% short term fiber strain when exposed to a short term tensile load of 400 N.

4. The optical fiber cable of claim 2, wherein the at least one optical fiber experiences less than or equal to 0.5% permanent fiber strain when exposed to a permanent tensile load of 100 N.

5. The optical fiber cable of claim 1, further comprising an inner jacket having an outer surface facing the inner surface of the outer jacket and an inner surface defining an inner jacket bore, wherein the plurality of aramid fibers are located between the outer surface of the inner jacket and the inner surface of the outer jacket and the at least one optical fiber is located in the inner jacket bore.

6. The optical fiber cable of claim 5, wherein at least one of the outer jacket and the inner jacket are formed from a fire-resistant, non-corrosive polymer material.

7. The optical fiber cable of claim 1, wherein there are no metal strength members or glass yarn strength members located within the central bore, wherein the at least one optical fiber experiences less than or equal to 1.5% short term fiber strain when exposed to a short term tensile load of 400 N, and further wherein the optical cable has an a1 acidity during burn as measured by EN 50267-2-3.

8. The optical fiber cable of claim 1, wherein a maximum outer dimension of the outer jacket is less than 3 mm.

9. The optical fiber cable of claim 1, wherein a maximum outer dimension of the outer jacket is between 2.3 mm and 2.7 mm, wherein the at least one optical fiber comprises 1 to 12 optical fibers.

10. An optical fiber cable comprising:
    an outer jacket having an outer surface defining an outermost surface of the optical fiber cable, an inner surface defining a central bore and a maximum outer dimension of less than 3 mm;
    one or more aramid fibers located in the central bore, wherein the one or more aramid fibers have a relatively low total linear density such that a total linear density of all aramid fibers within the central bore is less than 10,000 dtex; and
    one to twelve optical fibers located within the central bore;
    wherein there are no metal strength members or glass yarn strength members located within the central bore, wherein each of the one to twelve optical fibers experiences less than or equal to 1.5% short term fiber strain when exposed to a short term tensile load of 400 N, and further wherein the optical cable has a conductivity of less than <2.5 µS/mm during burn as measured by EN 50267-2-3.

11. The optical fiber cable of claim 10, wherein each of the one to twelve optical fibers has a proof test equal to or greater than 200 kpsi, wherein the total linear density of all aramid fibers within the central bore is between 3,000 and 7,000 dtex.

12. The optical fiber cable of claim 10, wherein each of the one to twelve optical fibers experiences less than or equal to 0.5% permanent fiber strain when exposed to a permanent tensile load of 100 N.

13. The optical fiber cable of claim 10, wherein the maximum outer dimension of the outer jacket is between 2.3 mm and 2.7 mm.

14. The optical fiber cable of claim 10, further comprising an inner jacket having an outer surface facing the inner surface of the outer jacket and an inner surface defining an inner jacket bore, wherein the one or more aramid fibers are located between the outer surface of the inner jacket and the inner surface of the outer jacket and the one to twelve optical fibers are located in the inner jacket bore.

15. The optical fiber cable of claim 14, wherein at least one of the outer jacket and the inner jacket are formed from a fire-resistant, non-corrosive polymer material.

16. An optical fiber cable comprising:
   an outer jacket having an outer surface defining an outermost surface of the optical fiber cable, an inner surface defining a central bore and a maximum outer dimension of less than 3 mm;
   an inner jacket having an outer surface facing the inner surface of the outer jacket and an inner surface defining an inner jacket bore;
   a plurality of aramid fibers located between the outer surface of the inner jacket and the inner surface of the outer jacket, wherein the plurality of aramid fibers have a relatively low total linear density such that a total linear density of all aramid fibers within the central bore is between 3,000 and 7,000 dtex; and
   one to twelve optical fibers located within the inner jacket bore, wherein each of the one to twelve optical fibers has a proof test equal to or greater than 200 kpsi;
   wherein each of the one to twelve optical fibers experiences less than or equal to 1.5% short term fiber strain when exposed to a short term tensile load of 400 N, and further wherein the optical cable has a conductivity of less than <2.5 µS/mm during burn as measured by EN 50267-2-3.

17. The optical fiber cable of claim 16, wherein there are no metal strength member or glass yarn strength members located within the central bore.

18. The optical fiber cable of claim 16, wherein at least one of the outer jacket and the inner jacket are formed from a fire-resistant, non-corrosive polymer material.

19. The optical fiber cable of claim 16, wherein each of the one to twelve optical fibers experiences less than or equal to 0.5% permanent fiber strain when exposed to a permanent tensile load of 100 N.

* * * * *